United States Patent
Mitra et al.

(10) Patent No.: US 8,166,448 B2
(45) Date of Patent: Apr. 24, 2012

(54) RAPID DEVELOPMENT OF DISTRIBUTED WEB SERVICE

(75) Inventors: Rudra Raj Mitra, Redmond, WA (US); Paramesh Siddesha, Bellevue, WA (US); Ken H. Thai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/754,106

(22) Filed: May 25, 2007

(65) Prior Publication Data

US 2008/0295064 A1    Nov. 27, 2008

(51) Int. Cl.
*G06F 9/44*    (2006.01)
(52) U.S. Cl. ............ 717/100
(58) Field of Classification Search .......... None
See application file for complete search history.

(56) References Cited

U.S. PATENT DOCUMENTS

| | | | |
|---|---|---|---|
| 5,500,941 A | 3/1996 | Gil | |
| 5,587,935 A | 12/1996 | Brooks et al. | |
| 5,991,794 A | 11/1999 | Hodges et al. | |
| 6,289,502 B1 | 9/2001 | Garland et al. | |
| 6,769,114 B2 * | 7/2004 | Leung | 717/124 |
| 7,124,413 B1 | 10/2006 | Klemm et al. | |
| 7,150,000 B1 | 12/2006 | Feldman | |
| 2003/0018950 A1 | 1/2003 | Sparks et al. | |
| 2003/0058280 A1 | 3/2003 | Molinari et al. | |
| 2003/0192027 A1 | 10/2003 | Porter | |
| 2004/0221242 A1 * | 11/2004 | Chen et al. | 715/810 |
| 2005/0223362 A1 * | 10/2005 | Whitlock et al. | 717/126 |
| 2007/0006122 A1 * | 1/2007 | Bailey et al. | 717/101 |
| 2008/0028368 A1 * | 1/2008 | Depew et al. | 717/120 |

OTHER PUBLICATIONS

Medvidovic, Nenad et al., "Reusing Off-the-Shelf Components to Develop a Family of Applications in theC2 Architectural Style", *Dept. of Information and Computer Science*, University of California, Irvine, 7 pgs.
Chen, De-jiu, "Towards a Software Component Framework for Mechatronics Applications", *Royal Institutes of Technology*, Mechatronics Laboratory, Dept. of Machine Design, Stockholm Sweden, 17 pgs.

* cited by examiner

*Primary Examiner* — Wei Zhen
*Assistant Examiner* — Adam R Banes
(74) *Attorney, Agent, or Firm* — Wolf, Greenfield & Sacks, P.C.

(57) ABSTRACT

Development tools and a methodology for efficient development of distributed web services. A tool tracks changes in packages used to create images deployed for testing. Rather than build a complete image for each change, a current image may be created by substituting changed packages in a previously created image. Another tool allocates components of an image to a number of servers specified by a user of the tool. Such a tool simplifies integration testing of the web service by allowing a developer to initially test a web service on a single server or a small number of servers and then easily scale-up the test environment. The servers may be physical servers or may be virtual servers. Interface rules for packages that constitute the software for the web service are defined to reduce the likelihood of integration problems as the environment is scaled up.

10 Claims, 10 Drawing Sheets

RAPID DEVELOPMENT OF DISTRIBUTED WEB SERVICE

BACKGROUND

With the expanded use of the Internet, web services are becoming more complex and more prevalent. For example, a web service hosted by a bank may allow users to access their accounts and perform banking transactions. Retailers may host web services to allow their customers to purchase items electronically. More generally, web services allow users to engage in a wide range of transactions using the Internet.

Developing software for such web services poses a particular challenge because the software is frequently implemented as multiple components that are deployed on multiple servers via different packages. For example, a web service may contain a front end tier that provides an interface allowing multiple users to access the service. The front end tier may interface to a middle tier, which may in turn interface to a database or other back end tier. Conventional service architectures may include two, three or four tiers, each of which may be implemented as multiple packages. Each tier may implemented by deploying the packages on one or more servers.

Each package may be developed by a different development team. For testing, each package is initially tested in isolation. The packages are then integrated and deployed in a test environment configured to provide test results that accurately predict operation of the packages together when they are deployed in a production environment. To support integration testing, an organization developing web applications may have a server farm containing numerous servers. The servers in the farm can be configured to provide the same configuration of servers that will exist in the production environment.

As revisions are made to packages, a new build of the web service is created and again deployed in the server farm for further testing and debugging. This process may be repeated iteratively until the software is ready for deployment in a production environment.

SUMMARY OF THE INVENTION

The time and cost required to develop distributed web services software may be reduced through the use of a tool or tools that manage deployment of packages in a test environment. In one aspect, a tool may manage a process by which an image containing each package in a known good state is maintained. Such a tool may track the state of packages used to create a build of the web service. If any packages used in creating a build have changed, the changed packages may be replaced in the build with updated versions without requiring a new build.

In another aspect, a tool may allocate packages of a build to a number of servers specified by a software developer. The tool may then deploy the software to servers in a server farm based on the specified configuration. The specified server configuration may have as few as one server or may contain multiple servers. In use, the software developer may initially specify testing on one server and may scale-up to multiple servers for integration testing by changing inputs to the tool.

In some embodiments, to provide ready reconfigurability of the test environment, servers used for testing may be virtual servers implemented on one or more physical servers.

Further, to ensure that accurate test results are achieved even with a relatively small number of servers, packages may be developed in compliance with guidelines that reduce the likelihood of integration errors as the web service is scaled up from execution on one or a few servers to execution on many servers in a test or production environment.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
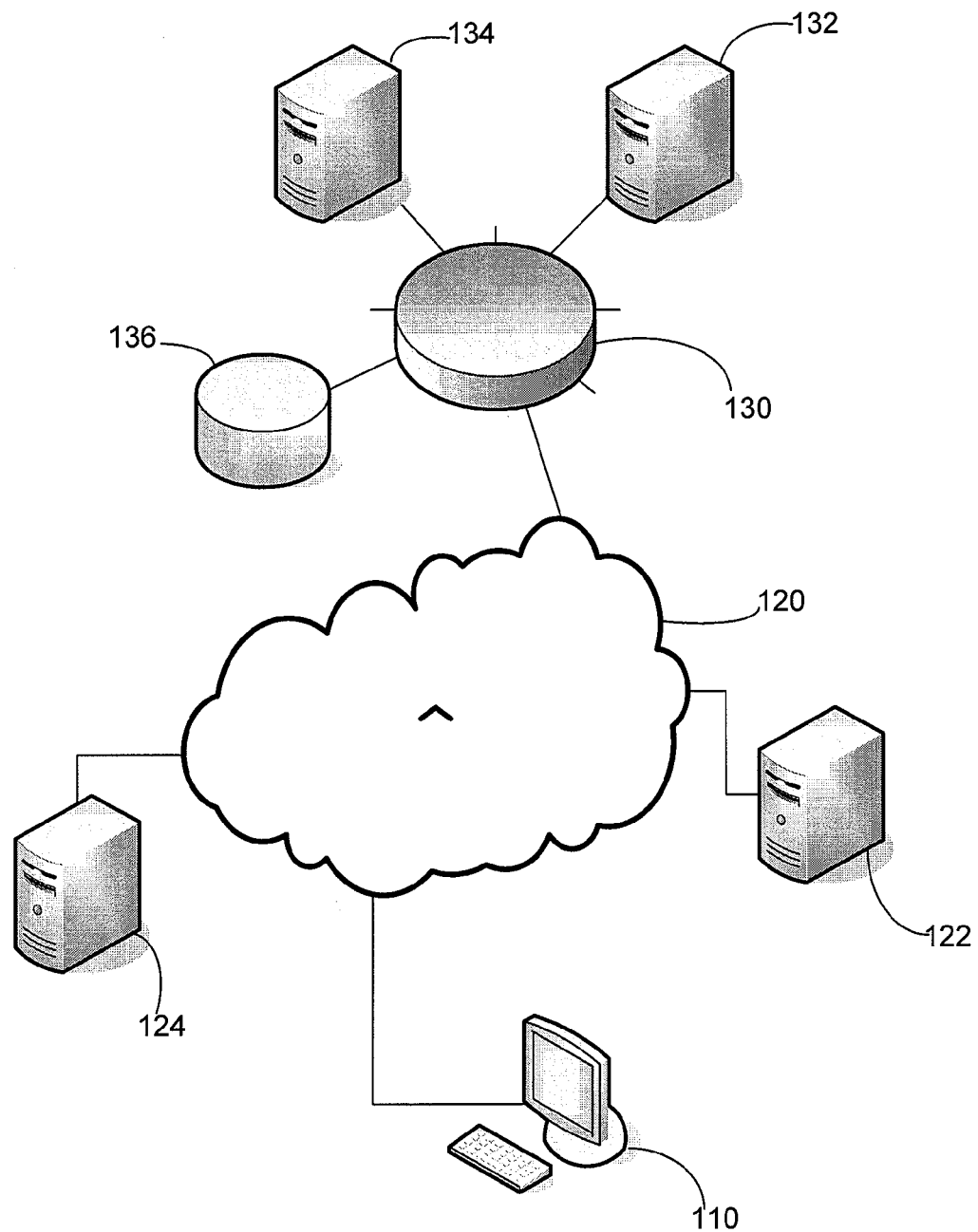
FIG. 1 is a sketch of a prior art distributed web service.

The inventors have appreciated that software for distributed web services is frequently developed according to an inefficient process. Further, the inventors have appreciated both that process changes may improve development efficiency and that one or more tools may be used to support development with such an improved process.

Inefficiencies in the development process result from the practice of aggregating and deploying packages developed by multiple developers in order to test the integration of those separately developed packages. Integrating different machines and deploying code to those machines can be time-consuming and may slow the turnaround time on development and testing. As a result, developers frequently do not perform integration testing until late in the software development cycle. Deferring integration testing reduces the possibility that integration errors will be found, which can impact software quality. Further, the effort required to correct errors in software increases as the time between initial coding and correction of the errors increases.

To reduce inefficiencies in the software development cycle, software packages may be developed to perform the same whether integrated on multiple servers or on a single server. As a result, integration testing initially may be performed on a single server and may be more readily performed, encouraging developers to perform integration testing early in the development cycle. Integration testing may be more readily performed because less hardware is required to obtain meaningful results and the required hardware is therefore more likely to be available. Integration testing is also facilitated because multiple physical servers need not be configured and integrated, reducing the time required to deploy code for integration testing.

Developing packages that perform the same whether integrated on one machine or across multiple machines facilitates a process in which integration testing is initially performed on a single machine. As a result, integration testing may be performed on packages early in their development cycles. Any integration errors may be identified and corrected close in time to their development, increasing the quality of the software and reducing the cost of correcting the errors. Later in the development cycle, integration testing may be scaled up by deploying the software across multiple machines.

To support a process in which integration testing is scaled up over time, integration testing may be performed on physical devices configured to implement one or more virtual servers. Scale-up may be performed by reconfiguring the number of virtual servers implemented on the physical devices.

Such a development process may be facilitated by one or more tools that aid a developer in deploying software into a desired configuration. As one example of a function that may be performed, a tool may track the last good state of a package to determine whether that package should be replaced in a previously deployed image. In addition, a tool may receive user input specifying servers upon which packages should be deployed. Through such a tool, a user may readily specify the number of servers on which a package is to be deployed for integration testing. In this way, the user may readily scale-up a development test by changing inputs to a tool.

While a development process and development tools according to embodiments of the invention are useful for developing distributed web services, they may be used for developing any suitable type of software. Nonetheless, as an example and not as a limitation on the invention, FIG. 1 illustrates an environment in which a distributed web service may be deployed. In the scenario illustrated, the distributed web service is deployed in a production environment and may be accessed by one or more users. However, for simplicity, FIG. 1 shows a single user computer 110 through which a user may access the web service.

User computer 110 is shown connected to a network 120, allowing a user to access a distributed web service. One or more servers, such as servers 122, 124, 132 and 134, may be connected, either directly or indirectly, to network 120. A distributed web service may be implemented using software packages deployed on the servers 122, 124, 132 and 134. In some instances, each of the servers may be specialized to perform one or more functions of the distributed web service. For example, server 122 may implement the front end tier of the web service. Accordingly, server 122 may be configured to support numerous connections over network 120 to users of the web service.

In contrast, server 124 may be configured to implement a middle tier of the web service. Server 124 may be configured to rapidly perform computations or other data processing operations that occur in providing the web service. Servers 122 and 124 may communicate across network 120 or in any other suitable way so that server 124 may perform processing in response to user inputs received at server 122.

Other servers may be configured to perform other functions. For example, servers 132 and 134 may be clustered servers that collectively manage interactions with a database 136. As shown, servers 132 and 134 and database 136 are connected through local network 130, which is in turn coupled to network 120. In this way, all of the servers implementing the web service may interact.

The number and types of servers implementing a web service is not critical to the invention. Nonetheless, FIG. 1 illustrates that deployment of a distributed web service entails integration of multiple servers. Likewise, testing of a distributed web service during its development entails creating a test environment in which integration on multiple servers may be tested.

Figure 2:
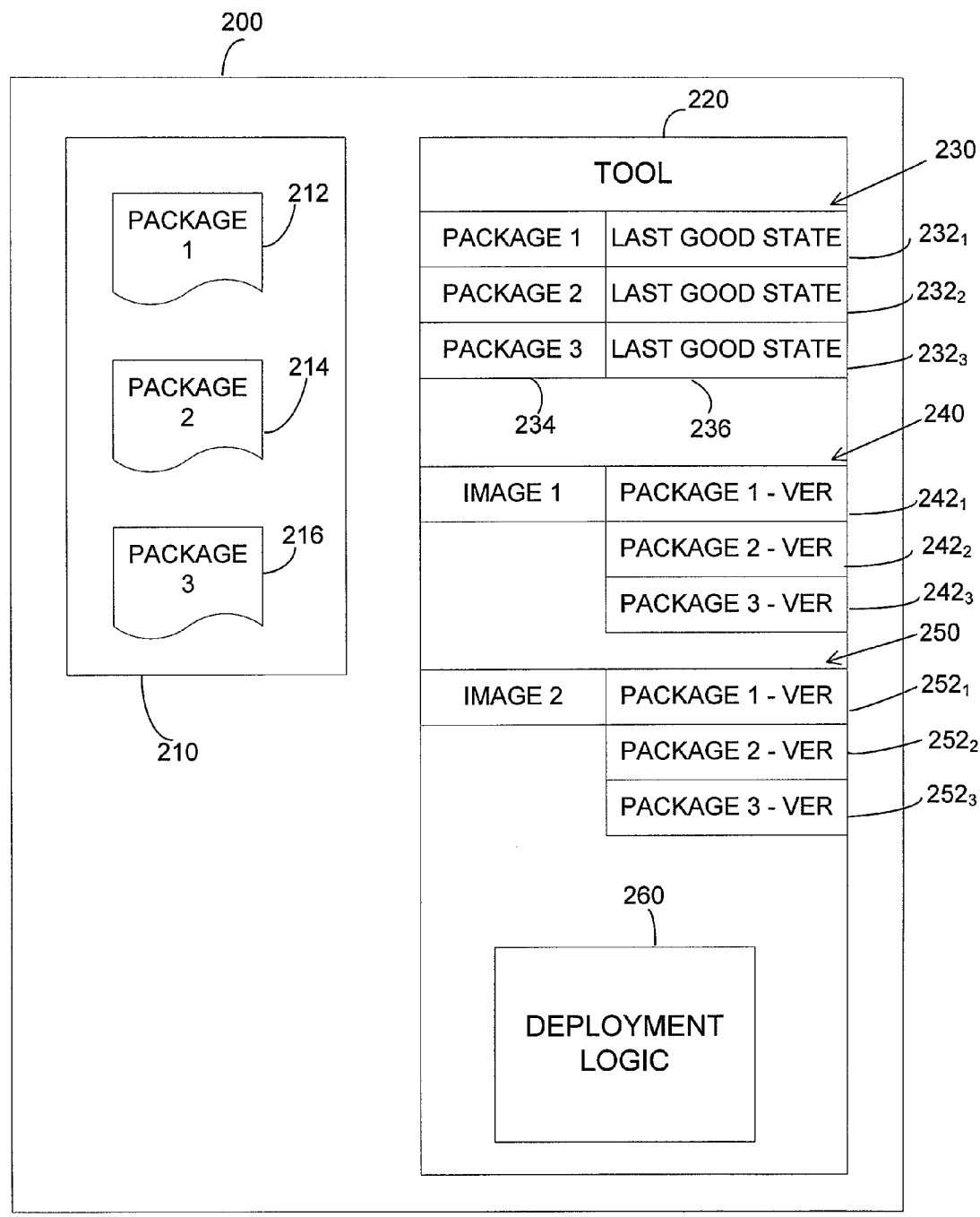
FIG. 2 is a block diagram of a development environment according to an embodiment of the invention.

FIG. 2 illustrates development environment 200 that may facilitate testing of a distributed web service according to embodiments of the invention. In the example of FIG. 2, development environment 200 includes developmental code 210. In the embodiment illustrated, packages 212, 214 and 216 are illustrated. Each of the packages 212, 214 and 216 is a component of the software under development. Some programming languages use the term "package" to refer to a specific software structure. However, the invention is not limited to any specific programming language. Accordingly, the term "package" may refer to any suitable component, regardless of how implemented.

In the embodiment illustrated, each of the packages 212, 214 and 216 may be created by an individual developer or development team. FIG. 2 is a simplified representation of a development environment. Accordingly, three packages are illustrated for simplicity. However, a development environment may contain numerous packages that are under development by multiple development teams, and integration of all of the development code 210, in some embodiments, may be a relatively complex task.

To facilitate integration of development code 210, development environment 200 may contain one or more tools, here illustrated as tool 220. In the embodiment illustrated, tool 220 performs functions associated with deploying development software 210 in a test environment. In the example illustrated, development code 210 may be stored in a central repository in computer-readable medium associated with one or more servers or other location accessible to multiple developers. In contrast, in the embodiment illustrated, tool 220 may be resident on a workstation of an individual developer. Though, tool 220 may be implemented in any suitable fashion in any suitable location. Regardless of how implemented, each developer may access a copy of a development tool, such as tool 220. In this way, tool 220, or multiple instances of tool 220, may manage generation and deployment of developmental code 210 on a user-by-user basis.

To manage deployment of developmental code 210, tool 220 may manage or access one or more data structures providing information about the developmental code 210. In the embodiment of FIG. 2, tool 220 accesses a data structure 230 containing information about the last good state of the packages forming developmental code 210. In the simplified illustration of FIG. 2, data structure 230 contains three rows $232_1$, $232_2$ and $232_3$, corresponding to the three packages 212, 214 and 216 that form developmental code 210. Each of the rows $232_1 \ldots 232_3$ contains information about the last good state of one of the packages. Taking row $232_3$ as illustrative, the row contains a field 234 and a field 236. Field 234 may contain a value identifying a package of the developmental code 210. Field 236 may contain a value identifying the last good state of the corresponding package.

In this context, a "good state" identifies a package that has been classified by its developers as ready for integration testing. Such packages may be developed using known software development processes. For example, a package may be deemed to be in a good state when it is fully implemented and tested in a stand alone configuration. As another example, a package may be deemed to be in a "good state" before it is fully developed if its developers believe all interfaces to the package perform as intended. However, the specific mechanism by which a package is developed and placed in a "good state" is not critical to the invention.

Regardless of how "good state" is defined, the information in data structure 230 may be updated as developers work on the packages of developmental code 210. In the embodiment illustrated, developmental code 210 may represent code stored within a configuration management system. During development of the code, developers may check out and check in packages. Each time a developer checks in a package, it may indicate to the configuration management system the state of that package. Accordingly, table 230 may be updated each time a package is added to developmental code 210. However, the information in data structure 230 may be maintained in any suitable way. For example, in some embodiments, table 230 may be updated only when needed.

Regardless of the mechanism by which the information in data structure 230 is maintained, tool 220 may use that information to build images of the distributed web service software. For example, tool 220 may contain deployment logic 260 that, in response to user input, may build an image using the last good stage for each package of development software 210. Such an image may be constructed using known software development techniques or in any other suitable way. In the example embodiments provided herein, an image may include one or more executable files, called MSI, and associated courier files containing data used upon execution of the MSI. To deploy an image on a single server, an MSI may be constructed for that server. To deploy an image on multiple servers, an MSI and a related courier file may be constructed for each of the servers. Upon execution of the MSI, the server may install software from packages designated for execution on that server. Accordingly, by appropriately constructing the installation files provided to one or more servers in a development environment, deployment logic 260 may configure a deployment of developmental code 210.

Once an image is initially deployed, changes made to developmental code 210 may be reflected in the deployed code by creating new installation files and executing those files on each server that is used for testing. However, after an initial deployment, it may be possible to update previously deployed code by altering only the deployed code corresponding to changed packages. To aid in identifying changed packages, tool 220 may maintains a data structure 240.

As illustrated, data structure 240 maintains information concerning the packages used to construct an image that has been deployed. In the example of FIG. 2, data structure 240 is associated with an image, denoted "Image 1." Data structure 240 contains multiple records $242_1$, $242_2$ and $242_3$ showing the versions of packages used to form the image.

When a user requests that the distributed web software be redeployed, tool 220 may compare information in data structures 240 and 230 to identify the packages that have changed since the image was deployed. For example, if record $242_1$, identifies a version of Package 1 that is different than the version identified as the last good state for Package 1 in row $232_1$, the version of Package 1 in its last good state may be redeployed. Similarly, comparison of records $242_2$ and information in row $232_2$ may indicate whether an update to Package 2 is required. A similar comparison may be made for record $242_3$ and row $232_3$. By identifying only the packages that need to be redeployed, software for integration testing may be deployed quickly, facilitating earlier and more frequent integration tests.

In the embodiment illustrated, tool 220 may contain information on any number of images. In the example illustrated, data structure 250 is shown containing information on a second deployed image. The second image, for example, may be deployed on a different set of test resources than the first image represented by data structure 240. However, the number of images maintained by tool 220 is not critical to the invention and any suitable number may be used.

Figure 3A:
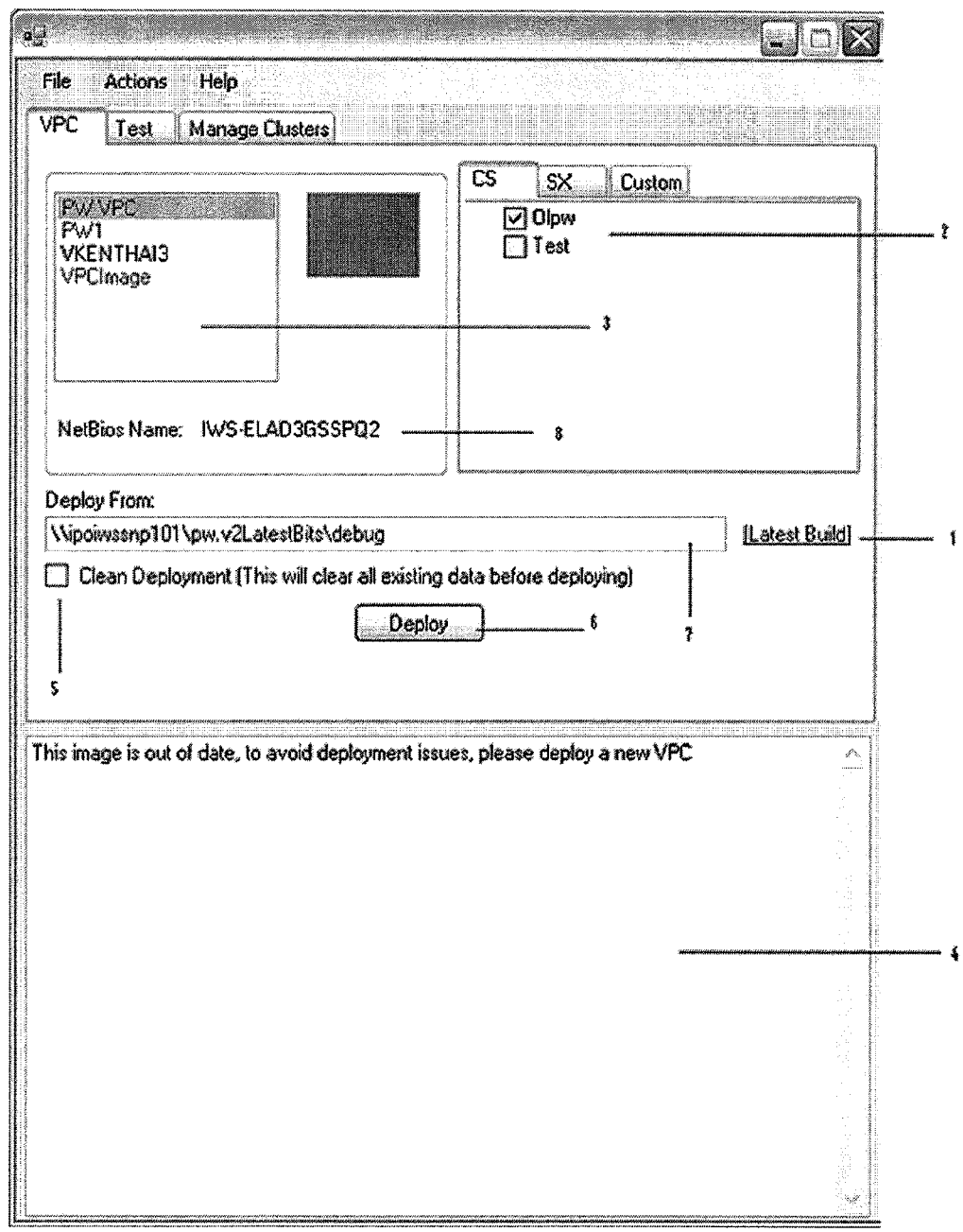
FIGS. 3A, 3B, 3C and 3D are sketches of a graphical user interface for a tool in a development environment according to embodiments of the inventions.

Regardless of the nature of information maintained by tool 220, the tool may deploy images and image updates in response to user input. FIG. 3A illustrates a graphical user interface that may be provided to a tool 220. A graphical user interface may be implemented using controls and other objects as are used in many types of programs that provide graphical user interfaces. These objects may provide an interface to computer executable instructions that implement functions of tool 220. However, the user interface may be implemented in any suitable way.

In the state depicted in FIG. 3A, the user interface is configured to receive information from a user specifying characteristics for deploying an image on a single device. That single device may be a physical device. However, in the embodiment illustrated, the device is a virtual device.

The interface of FIG. 3A contains control objects allowing a user to specify the specific software for deployment. In this example, control object 1 is a link entitled "Latest Build." When a user activates control object 1, tool 220 may automatically select the latest good build of all of the packages that the user wishes to deploy onto a single server, whether a physical server or virtual server.

Control area 2 allows the user to identify the components that the user wishes to deploy for test or debug. In this example, control area 2 is shown with multiple check box control objects, allowing a user to specify the combinations of components to be deployed. Tool 220 may populate control area 2 with names of components in developmental code 210. Control 220 may obtain information to populate a list of components in control area 2 in any suitable way. For example, the information may be obtained by querying a configuration management system holding development code.

However, the specific software to be deployed may be specified in any suitable way. For example, FIG. 3A illustrates a text box 7 into which a user may specify a path to a location on a computer from which tool 220 may retrieve software for deployment. Selecting link 1 may cause tool 220 to revert the information in text box 7 to a location storing the latest good build of the developmental software. A user may then modify the information in text box 7 if software stored in a different location is desired. However, the information in text box 7 may be entered in any suitable way.

The user interface of FIG. 3A also provides a mechanism for a user to specify a specific machine, whether physical or virtual, on which the software is deployed. List box 3 contains a list of machines that the user interfacing with tool 220 may use for deploying software. Tool 220 may obtain in any suitable fashion a list of machines on which it may deploy software. In some embodiments, the machines appearing in list box 3 may be formed based on user input. For example, FIG. 3B, below, pictures a graphical user interface for tool 220 in an alternative operating state. As described in greater detail in conjunction with FIG. 3B, a user may configure through this user interface a machine that may be used for deployment of developmental software. Regardless of how the list in list box 3 is created, selecting an entry on the list will control tool 220 to deploy software on that machine. Field 8 is a label indicating the host name of the machine that has been selected.

Tool 220 may accept input defining operating parameters. For example, check box 5 may be used to input a parameter specifying the nature of the deployment to be performed by tool 220. When checkbox 5 is checked, on the start of deployment, tool 220 will pave the machine to its original image state before deploying any new components on to it. Setting a parameter in this fashion allows a user to reset the states back to the original last known good state. Alternatively, if checkbox 5 is not checked, a deployment will alter only those components selected for deployment without otherwise effecting the state of the image on the selected machine.

Button 6 is a control object that, when selected, causes tool 220 to initiate deployment of software in accordance with the other parameters specified through the user interface of FIG. 3A. In some embodiments, tool 220 may respond to selection of button 6 by creating installation files targeted at the machine specified in list box 3 and containing the components identified in input area 2. However, tool 220 may deploy software in any suitable way.

A user interface to tool 220 may allow a user to input other parameters of the deployment. Likewise, a user interface may provide one or more types of information to a user. In the embodiment illustrated, area 4 is a log area. Tool 220 presents in log area 4 information on a current activity that it is performing information on the progress of an operation.

Figure 3B:
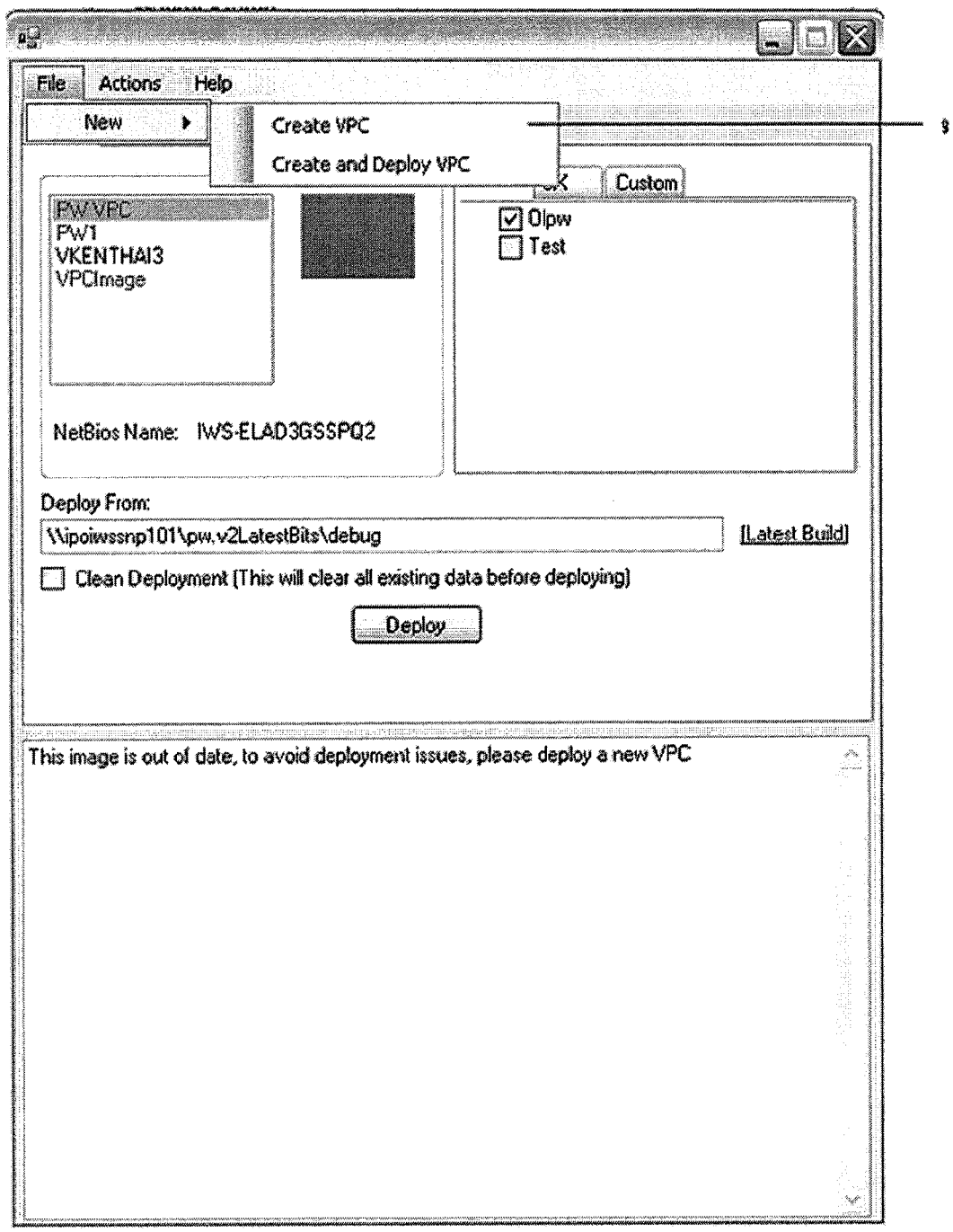

Tool 220 may also provide user interface capability to enable a user to perform functions in addition to deploying software. For example, FIG. 3B shows that a user interface may include a menu bar 310 through which a user may select additional commands that may be performed by tool 220. In the state illustrated, an entry "file" on menu bar 310 has been selected. As a result, the user interface presents a menu 9 to a user. Through menu 9, a user may select a command that causes tool 220 to create a new virtual machine that is ready to have developmental code deployed on it. In the embodiment illustrated, a virtual machine is created by copying the latest known good image and setting it up as a virtual machine. However, any suitable actions may be taken in response to selection of entries on menu 9.

Figure 3C:
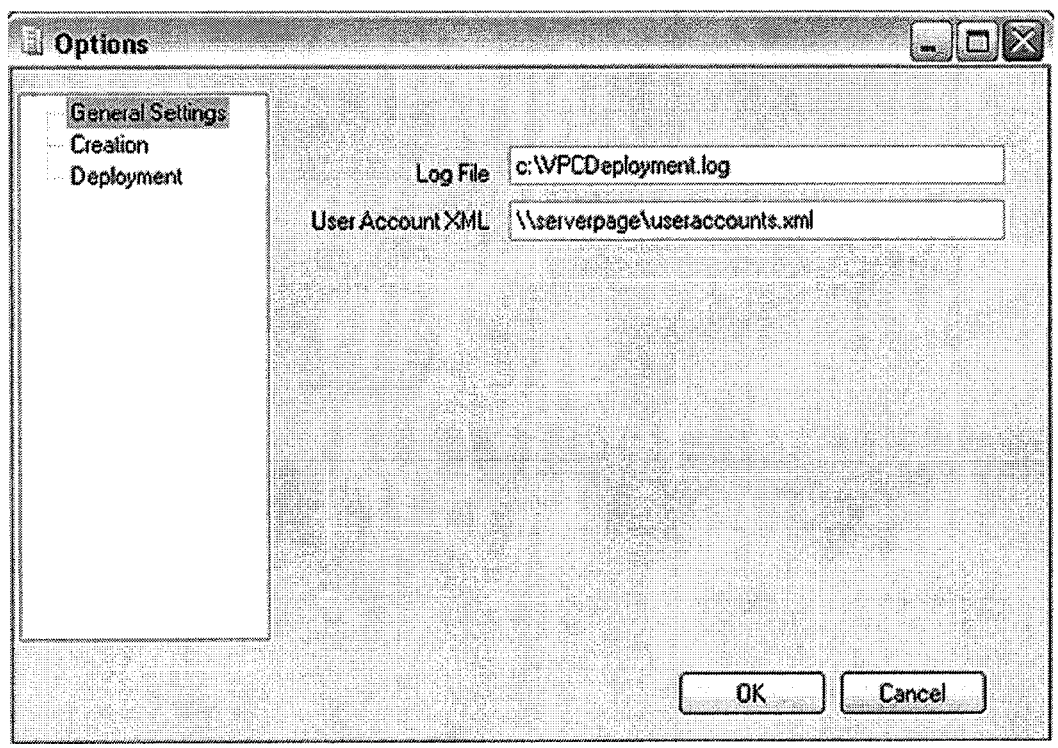

FIG. 3C illustrates further interactions through user interfaces that are possible. In the example of FIG. 3C, a user interface to an options menu is shown. The options menu may be invoked by selecting an "options" entry from an item in menu bar 310 (FIG. 3B). However, the menu as depicted in FIG. 3C may be invoked in any suitable way.

Regardless of how the menu of FIG. 3C is invoked, the options menu may allow a user to specify customized settings. For example, customized settings may specify a destination for writing log files or a location to query latest known good builds. Additional options may allow a user to specify characteristics of virtual machines. For example, a user may be presented with fields through which the user may specify an amount of memory on the physical machine to be designated to each virtual machine. An options menu such as depicted in FIG. 3C may allow user to specify options relating to the creation or deployment of developmental code or any other aspect of the operation of a development environment. A user interface presented by tool 220 may also be operable to allow a user to specify a deployment configuration including more than one server. However, the nature of options that a user may specify is not critical to the invention.

Figure 3D:
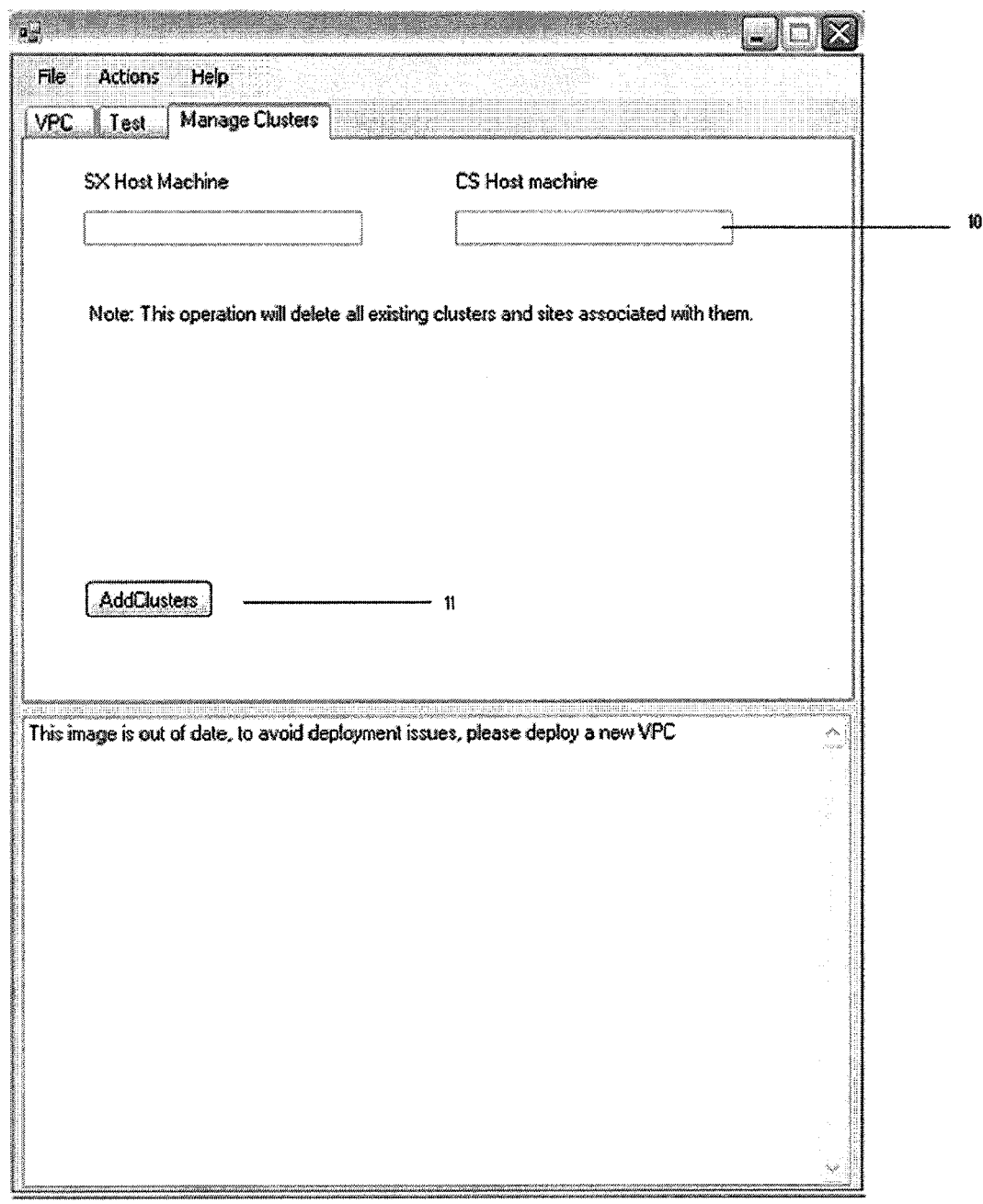

FIG. 3D provides an example of a user interface through which a user may specify a cluster of servers on to which developmental code 210 may be deployed. Field 210, for example, may be used to identify servers to link together for interserver communication. Button 11 may initiate processing by tool 220 that links the servers together to create a distributed cluster. As a result of operations invoked through the graphical user interface depicted in FIG. 3D, a user may deploy different components of development software 210 onto different servers, which are then linked. In this way, a user may use tool 220 to configure a development environment as part of scaling up an integration test. For example, a user may initially test developmental code deployed on single server. After successful integration on a single server, the user may then access the user interface of FIG. 3D to specify a server cluster on which the developmental code is deployed. The number of servers in the cluster may be increased so that, as integration testing is successful on a cluster of one size, the developmental code can be subsequently tested in a larger deployment.

Figure 4A:
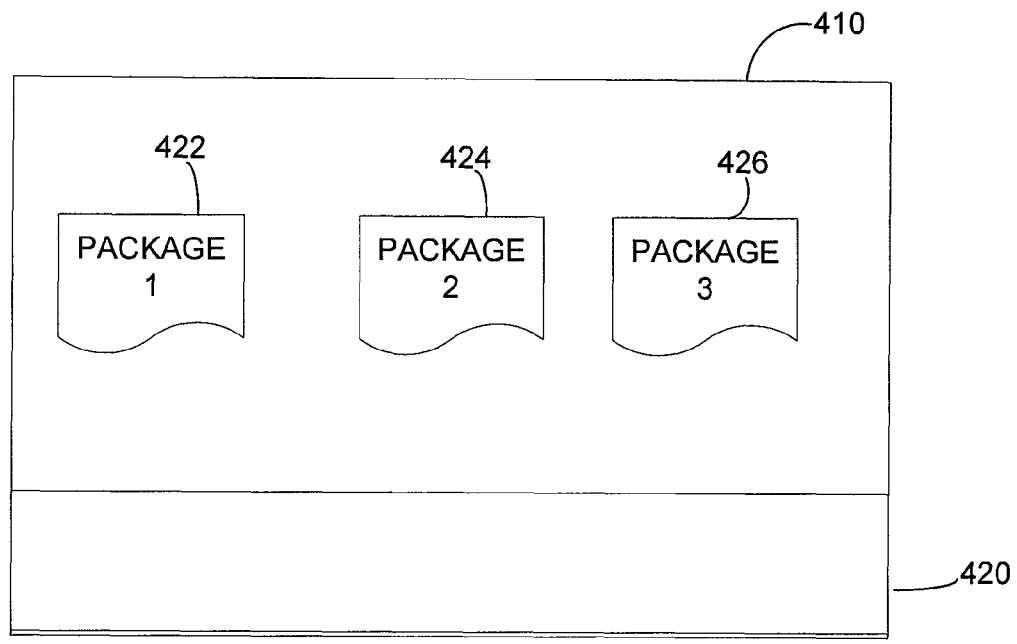
FIGS. 4A, 4B and 4C are sketches of alternative deployment configurations according to embodiments of the invention.
Figure 4B:
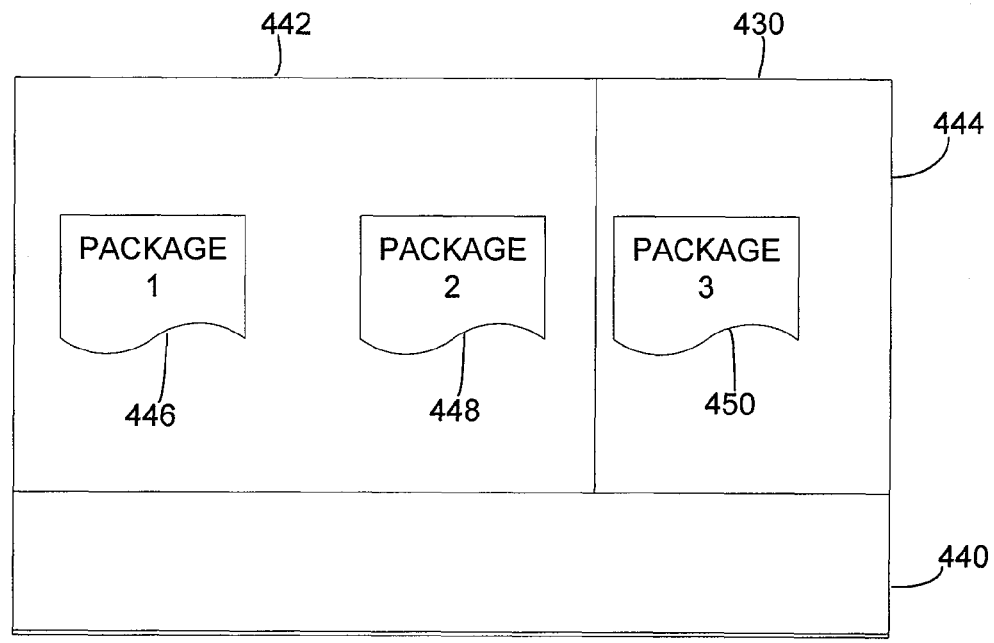
Figure 4C:
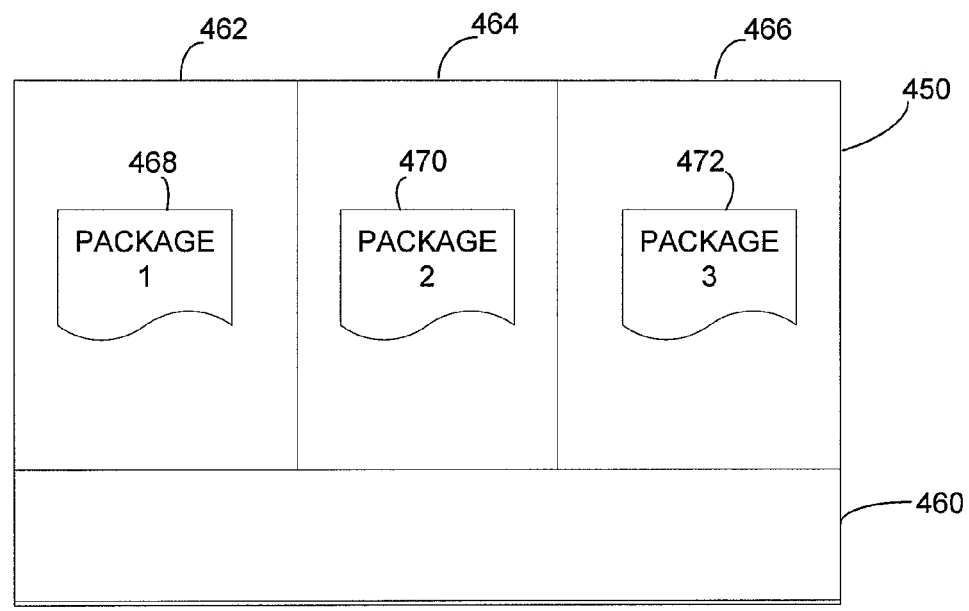

FIGS. 4A, 4B and 4C illustrate the flexibility that may be achieved with a tool, such as tool 220, that may configured based on user input as illustrated in FIGS. 3A . . . 3D. FIG. 4A shows schematically a physical machine 410. Physical machine 410 may be a server as is conventionally used in a test environment for executing developmental code under test. However, physical machine 410 may be any server or other suitable hardware device.

In the embodiment illustrated, physical machine 410 includes a virtualization component 420. Virtualization component 420 may be known software for creating on a physical machine one or more virtual servers. However, virtualization component 420 may be implemented in any suitable way. In the embodiment illustrated, virtualization component 420 is used to create a single virtual machine on physical machine 410. The developmental code is deployed on this single virtual machine. Accordingly, FIG. 4A shows components 422, 424 and 426, here representing components generated from the developmental code 210 (FIG. 2), all resident on the single virtual machine. Such a deployment, for example, result from operating tool 220 through an interface of the form shown in FIG. 3A.

FIG. 4B shows an alternative test configuration that may be achieved using a tool such as tool 220. FIG. 4B shows a physical machine 430 including a virtualization component 440. Machine 430 and virtualization component 440 may be similar to physical machine 410 and virtualization component 420 (FIG. 4A). However, any suitable hardware and software elements may be used to create the test environment illustrated in FIG. 4B.

The deployment environment of FIG. 4B differs from that in FIG. 4A in that the virtualization component 440 is used to create two virtual machines, here illustrated as virtual machine 442 and virtual machine 444. In the embodiment illustrated, components 446 and 448 are deployed on virtual machine 442. Component 450 is deployed on virtual machine 444. Accordingly, the test environment of FIG. 4B may represent a test environment created after integration testing in the environment of FIG. 4A is successfully completed. A similar test environment could alternatively be created on two separate physical machines. However, using two virtual machines as illustrated in FIG. 4B reduces the amount of hardware required for integration testing an also avoids complexities that could arise in integrating two separate physical machines.

Integration testing may be scaled up by creating any number of virtual machines on one physical machine. For example, FIG. 4C illustrates a physical machine 450 with a virtualization component 460. In the configuration of FIG. 4C, virtualization component 460 is used to create three virtual servers, 462, 464 and 466. Each component of the distributed web service under development may be deployed on a separate virtual server to emulate a production environment. For example, component 468 is shown deployed on virtual server 462. Component 470 is shown deployed on virtual server 464. Component 472 is shown deployed on virtual server 466.

Though three virtual servers are shown, any number of virtual servers may be created, allowing a deployment to be scaled from a single server to any number of servers up to the number of servers that may be used in a production environment. In this way, a user may rapidly reconfigure the development environment for integration testing at any scale.

Figure 5:
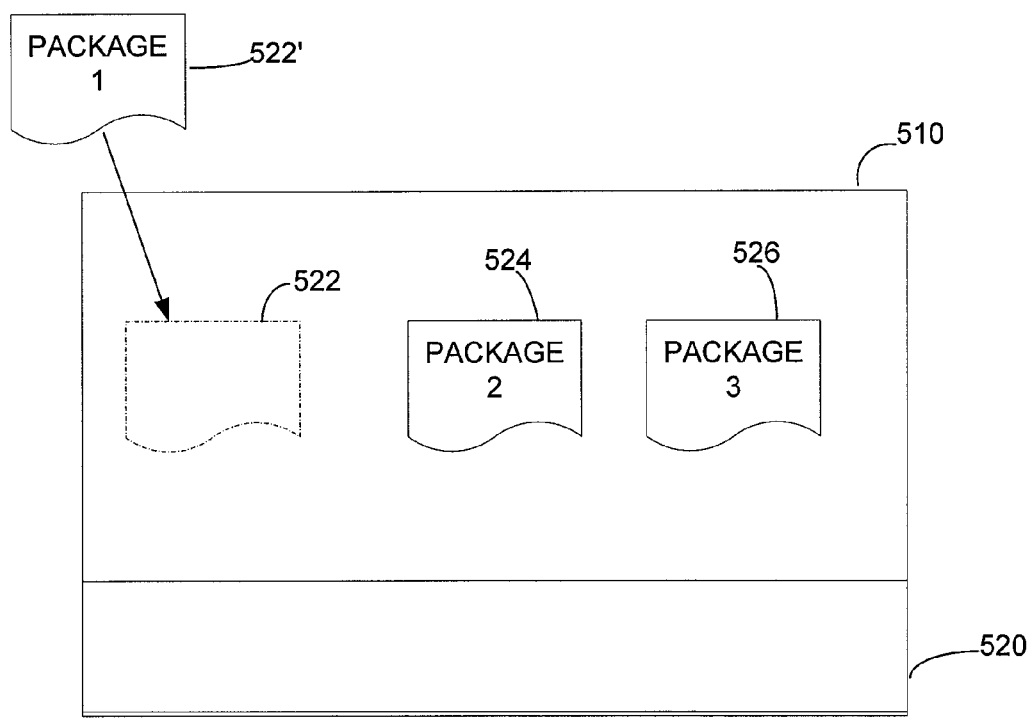
FIG. 5 is a sketch illustrating operation of a tool according to an embodiment of the invention.

FIG. 5 illustrates a further advantage that may be achieved with a tool, such as tool 220. FIG. 5 illustrates a physical machine 510 on which a virtualization component 520 is deployed. Physical machine 510 and virtualization component 520 may be similar to physical machine 410 and virtualization component 420 (FIG. 4A). However, any suitable hardware or software components may be used to implement the development environment pictured in FIG. 5.

In the example of FIG. 5, components 522, 524 and 526 are shown deployed on the virtual server created by virtualization component 520. During the course of development, a user may make changes to the web service code that impacts component 522. Consequently, a user may wish to replace component 522 with an updated component 522'. By operating a tool, such as tool 220, that may selectively replace components, the user may specify that component 522 be replaced by an updated version of that component 522'. In the example of FIG. 3A, this replacement may be achieved, for example, by selecting deploy button 6 without checkbox 5 being checked and input area 2 identifying only component 522'. However, the operating state depicted by FIG. 5 may be created in any suitable way.

Figure 6:
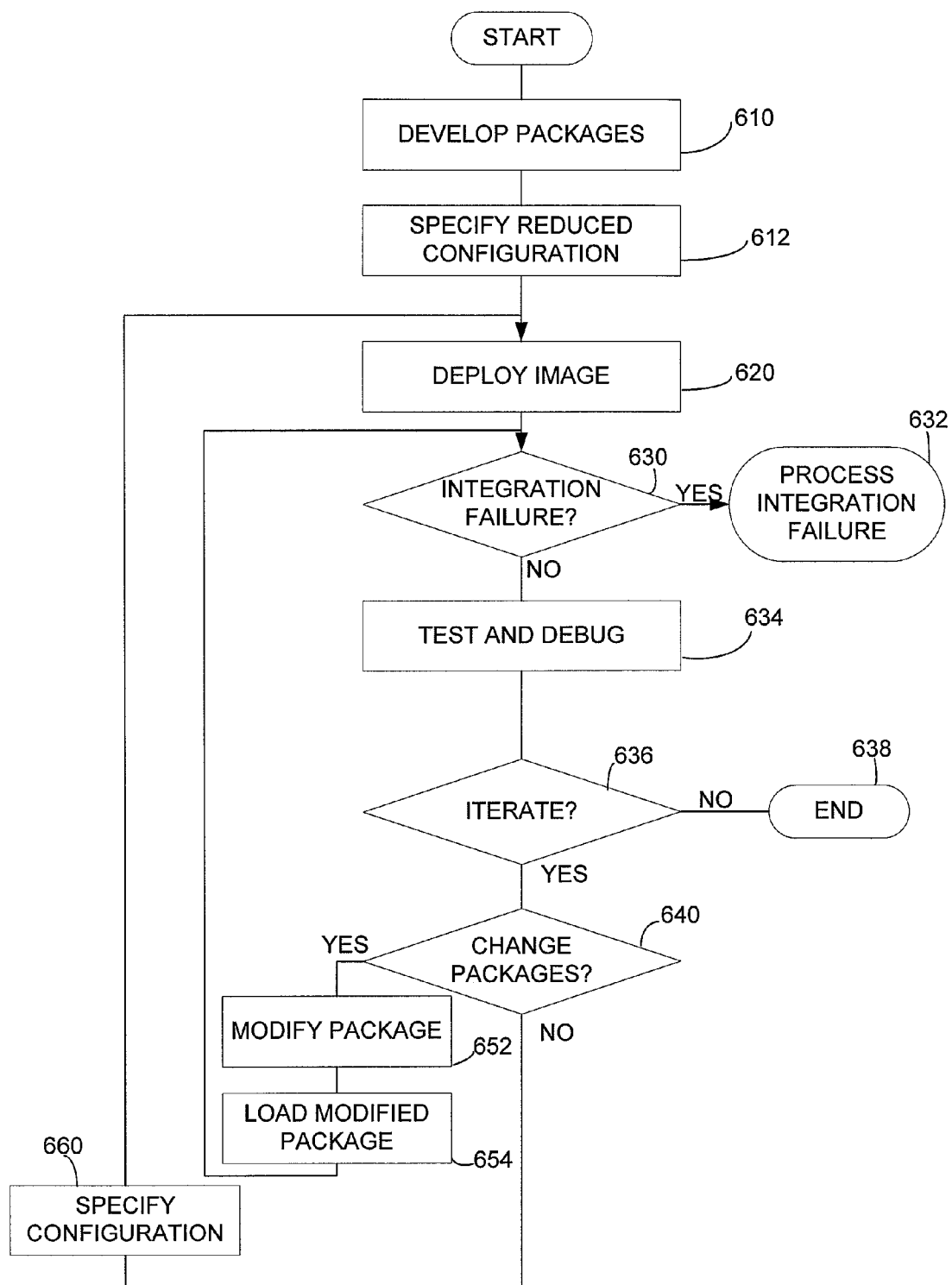
FIG. 6 is a flow chart of a process of developing a distributed web service according to an embodiment of the invention.

The capabilities provided by a development tool, such as tool 220, facilitate an improved development process for distributed web services software. FIG. 6 is a flowchart of an illustrative embodiment of an improved development process. The process of FIG. 6 begins at block 610. At block 610, the web services software is developed. In the example illustrated, development is performed on multiple packages. Packages may be developed by multiple developers or development teams. However, the specific manner in which packages are developed is not critical to the invention.

As part of development at block 610, the developers or development teams working on each package may test the packages individually. Testing as part of development at block 610 may be performed using known test techniques and tools. However, any suitable methods for development and testing of individual packages may be used at block 610.

When the packages are developed and tested individually, the process may proceed to block 612. Block 612, in the example of FIG. 6, represents the start of integration testing. At block 612, a user specifies a configuration for initial integration tests. According to the process of FIG. 6, integration tests are initially performed in a reduced configuration. In this context, reduced configuration includes deploying the code under development on fewer servers than may exist in a production environment for the distributed web service under development. Any suitable number of servers may be included in the reduced configuration specified at block 612. However, according to some embodiments of the process, the reduced configuration specified at block 612 for initial integration testing includes a single server.

Processing at block 612 may include specifying a number of servers used for deployment and any other parameters associated with the configuration. For example, processing at block 612 may include specifying parameters of the server or servers on which the web service will be deployed. For example, inputs provided at block 612 may specify that the server or servers on which the software is to be deployed are virtual servers. For virtual servers, specifying a configuration may include identifying a physical server hosting the virtual server and may include specifying performance parameters of the virtual server, such as amount of memory or processing allocated to the virtual server.

The processing performed at block 612 may include interacting with a development tool, such as tool 220, through user interfaces, such as those pictured in FIGS. 3A . . . 3D. Accordingly, processing at block 612 may include providing user input on any of the parameters illustrated in FIGS. 3A . . . 3D. However, the mechanism by which a configuration of a test environment is specified at block 612 is not a limitation on the invention and any suitable mechanism may be used.

Once the configuration for initial deployment is specified at block 612, the process may proceed to block 620. Block 620, an image of the developed software may be deployed. In some embodiments, an image may be deployed by sending installation files to each server specified at block 612 to host a component of the developed software. However, the image may be deployed at block 620 in any suitable fashion.

The process then continues to decision block 630. At decision block 630, the process branches depending on whether integration at failure occurs. In some scenarios, software under development may contain errors that preclude some or all of the components of the software under development from being deployed. Additionally, in some scenarios, the configuration specified at block 612 may be incompatible with the software developed. Regardless of the source of the error, if the deployment at block 620 is not successfully completed, the process branches from decision block 630 to error handler 632. At error handler 632, integration errors are processed. Processing at error handler 632 may involve investigation by a development engineer or other individual or team and may entail modifications of software under development or an alternative specification of the test configuration or other corrective action. Once the corrective action is taken, the process of FIG. 6 may be repeated or any other suitable action may be taken.

Conversely, if no integration failure occurs, the process proceeds from decision block 630 to block 634. At block 634, the integrated software is tested and debugged. Known test and debug methods and tools may be used at block 634. However, any suitable test and debug mechanism may be employed.

Regardless of the specific tools and methods employed at block 634, one or more errors in the software under development may be detected as a result of processing at block 634. At decision block 636, the process may branch depending on whether further iterations of the process are required. One criteria used in determining whether a further iteration is required may be whether errors in the software were detected at block 634. A second criteria that may be applied at block 636, is whether the configuration for testing the software at block 634 represented a fully scaled-up test environment. In the process illustrated, no further iterations are required when the software is successfully tested when deployed in a fully scaled-up test configuration mimicking the production environment for the distributed web service. When that condition is detected, the process branches from decision block 636 to termination point 638. When the software reaches termination point 638, the software may be considered fully developed and ready for deployment in a production environment. However, any other processing may be performed at block 638. For example, further development may be initiated for other packages or other functionality of the web base software.

Conversely, if errors were detected during testing at block 634 or the testing was not performed in a fully scaled-up environment, processing may continue from decision block 636 to decision block 640.

At decision block 640, the process may again branch, depending on whether testing at block 634 indicated that any of the packages need to be changed to correct errors. If such changes are indicated, the process branches to block 652. At block 652, one or more packages may be modified to address errors detected at block 634. At block 654, the modified package or packages may be inserted into the test environment to replace the unmodified versions of those packages. As illustrated in FIG. 5, processing at block 654 may involve loading only components affected by the modification at block 652. However, in some embodiments, processing at block 654 may include loading a new image of all of the web services software under development, including any modified packages.

Regardless of how a modified package is loaded into the test environment at block 654, once the processing at block 654 is completed, the process loops back to decision block 630. Processing at decision block 630, block 634, decision block 636, decision block 640, block 652 and block 654 may be repeated iteratively either until no further iterations are required or no further changes to the software under development are made as a result of testing at block 634. No further iterations are required, the process may branch from decision block 636 to termination point 638. If no further changes to the software are identified, the process branches at decision block 640 to block 660.

At block 660, a configuration for a modified test environment may be specified. In some embodiments of the process of FIG. 6, processing at block 660 entails specifying a scaled-up test environment. According to some embodiments of the invention, processing at block 660 may include incrementally increasing the number of servers or other characteristics of the test environment. As with processing at block 612, processing at block 660 to specify a test environment may be performed in any suitable way. In some embodiments, processing at block 660 may employ the same tools used at block 612 to specify an initial test environment. However, regardless of how a configuration of the test environment that specified at block 660, processing loops back to block 620. An image of the web services software under development may then be prepared for the test environment specified at block 660. Thereafter, integration testing may proceed through decision blocks 630, block 634, decision block 636 and decision block 640, block 652 and 654 in the same fashion as for the initial test environment configuration specified at block 612. That processing may end a termination point 638 or proceed from decision block 640 to block 660. If processing reaches block 660, a further configuration for a test environment may be specified. According to some embodiments of the process, each time processing reaches block 660, the number of servers in the test environment or other parameter of the test environment may be increased to scale-up the test environment, bringing it closer to the actual production environment intended for the distributed web service software under development. The process of FIG. 6 may continue iteratively in this fashion until no integration errors are detected in the software when deployed in a test environment emulating the actual production environment. When this condition is reached, the process may branch from decision block 636 to termination point 638.

Figure 7:
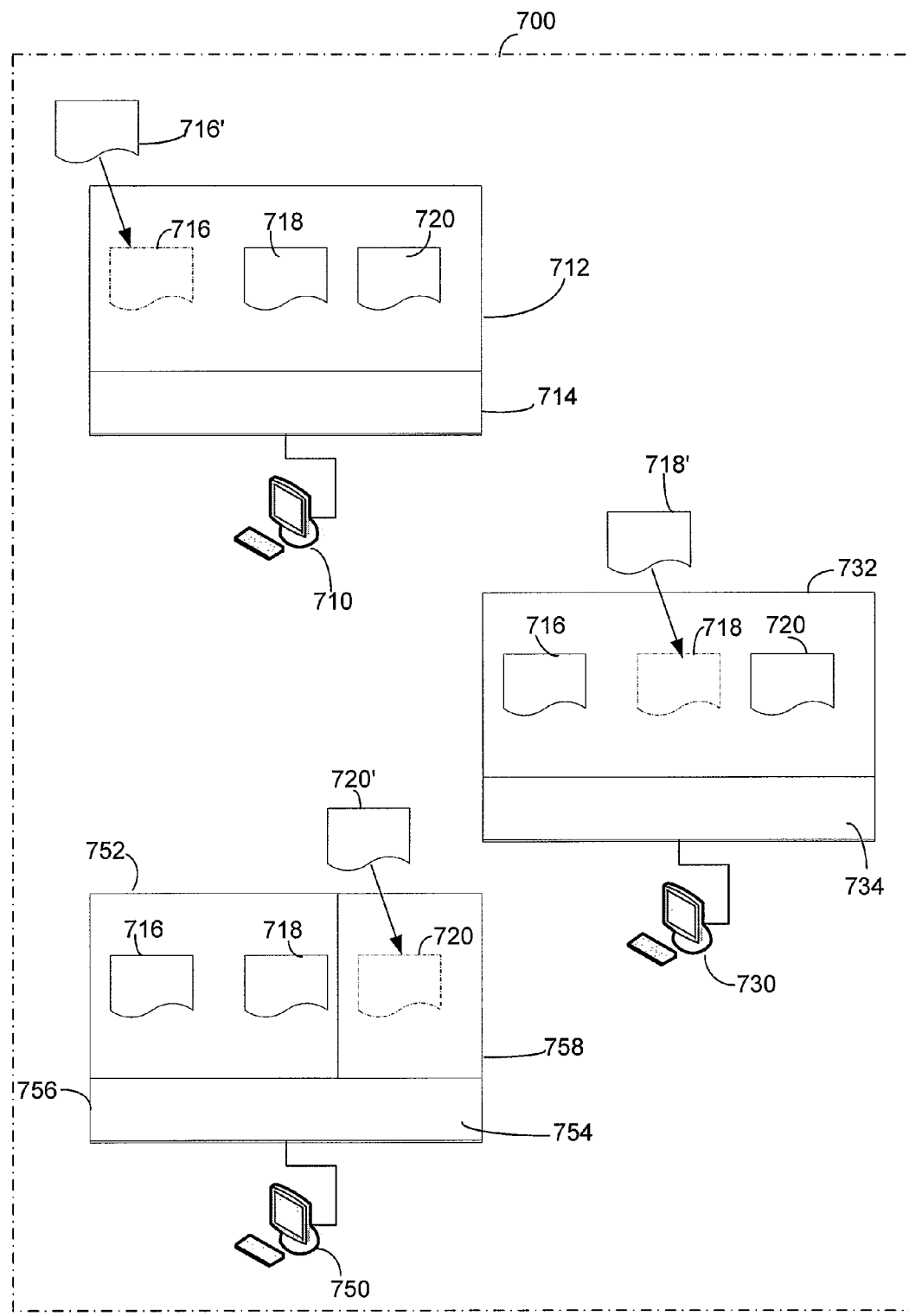
FIG. 7 is a sketch of a development environment operated according to an embodiment of the invention.

A development process as described in FIG. 6 may be employed by multiple developers simultaneously. FIG. 7 shows a development facility 700 containing facilities for multiple developers. In the example illustrated, three developer workstations 710, 730 and 750 are shown. An actual development facility may have many more developers than illustrated. However, the simplified example in FIG. 7 illustrates that multiple developers may simultaneously test components of the distributed web software under development.

For example, developer workstation 710 interfaces to a physical server 712. Physical server 712 contains a virtualization component 714. In the example illustrated, virtualization component 714 is configured to implement a single virtual server on physical device 712. Component 716, 718 and 720 are shown deployed on the virtual server created with virtualization component 714. In the scenario illustrated in FIG. 7, a developer using developer workstation 710 may desire to modify and test component 716. Component 716' represents a modified version of component 716. Using a tool and process as described above, the developer using developer workstation 710 may replace component 716 with component 716'. If component 716' is tested and deemed to be in a good state, the developer may replace component 716 with component 716' as the last good state for that component. However, if testing of component 716' determines that the component is unacceptable, the developer working at developer workstation 710 may revert to component 716.

Regardless of the decision that a developer makes with regard to component 716', other developers may continue to test software they are developing relative to the last known good state, which in this example is component 716. Accordingly, FIG. 7 shows a developer workstation 730 connected to a physical server 732. Physical server 732 includes a virtualization component 734 that creates a virtual server on which components of the web service under development may be deployed. In this example, components 716, 718 and 720 are shown deployed on the virtual server. However, the developer interacting through developer workstation 730 may desire to test a modified version of component 718, here designated component 718'. Accordingly, FIG. 7 shows component 718 being replaced by component 718' on the virtual server created by virtualization component 734. In the same way that developer using developer workstation 710 was able to modify and test component 716, a developer, working through developer workstation 730, may modify and test versions of component 718. Development activities and component 716 and 718 may thus proceed in parallel. Other developers may also simultaneously perform development activities on other components. For example, FIG. 7 illustrates a developer workstation 750. Developer workstation 750 interfaces with physical server 752. Physical server 752 includes virtualization component 754. In the scenario illustrated, virtualization component 754 is configured to create two virtual servers 756 and 758 on physical device 752. Components 716 and 718 are deployed on virtual server 756. Component 720 is deployed on virtual server 758. In the scenario illustrated, a developer working through developer workstation 750 may modify component 720 and load a modified component 720' for testing. As with other components being developed by other developers, if the testing of component 720' is successful, it may be saved as the last known good state of component 720. Otherwise, component 720 may remain as the last good state for that component.

Though FIG. 7 is a simplified illustration of a test environment, demonstrates advantages that may be achieved with the process according to the invention. Multiple developers may create individual test environments. In each test environment, different components may be tested. Further, each test environment may contain a different test configuration. For example, the environment created on physical server 752 contains two virtual servers while the environments created on physical servers 712 and 732 contain a single server. Because of the flexibility provided to the use of virtual servers in the easy configurability provided through the use of tools, such as tool 220, multiple test environments may be created.

In implementing the process illustrated in FIG. 6, it may be desirable to initially develop packages or other software such that it is "agnostic" as to the number of servers on which it is deployed.

One or more development guidelines may be applied to ensure that each package operates correctly, regardless of the number of servers on which an image containing the package is deployed. Examples of development guidelines include:

Port Management—In order for all services to be able to reside on the same machine without conflicts they should not be deployed to conflicting ports. When choosing commonly used ports, each service may be given a defined host header to avoid conflicts.

Database Management—When all services reside on the same server, they will share the same back-end database. Therefore, any operations performed on the database and its tables by each service should not conflict with another operation.

Setup Management—packages may be bundled into an MSI, with an associated courier file. The courier file may be an XML that defines the properties of the MSI, these properties include the MD5 hash of the MSI, all the parameters that are to be fed to the MSI during installation.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of developing software for a distributed service comprising a plurality of packages containing software components configured to execute while distributed on a plurality of servers, the method comprising:

specifying a configuration for integration test, the configuration including fewer servers than the plurality of servers in the distributed service under development, the configuration comprising one or more virtual servers in a single physical machine;

maintaining in a first computer-readable medium information on a known good state for the plurality of packages;

maintaining in a second computer-readable medium a first image of a first package and a second package of the plurality of packages, the second computer-readable medium being associated with at least one virtual server of the one or more virtual servers;

modifying the second package of the plurality of packages;

integrating into the at least one virtual server the modified second package of the plurality of packages;

testing at least a portion of the first image while the modified second package is integrated with the first package on the at least one virtual server; and when changes to the first image are not required, increasing the number of servers in the configuration and repeating the maintaining, the modifying, the integrating and the testing.

2. The method of claim 1, wherein maintaining the first image in the second computer-readable medium comprises maintaining the first image in the computer-readable medium associated with one virtual server.

3. The method of claim 2, further comprising:

loading a second image of the first package of the plurality of packages and the second package of the plurality of packages in a third computer-readable medium associated with a plurality of virtual servers; and testing at least a portion of the second image while loaded in the third computer-readable medium.

4. The method of claim 3, further comprising receiving user input specifying a number of the plurality of virtual servers.

5. The method of claim 3, further comprising:

loading the second image of the first package of the plurality of packages and the second package of the plurality of packages in a fourth computer-readable medium associated with a second plurality of virtual servers, the second plurality being different than the first plurality; and testing at least a portion of the second image while loaded in the fourth computer-readable medium associated with the plurality of virtual servers.

6. A method for developing software for a distributed service comprising a plurality of packages containing software components configured to execute while distributed on a plurality of servers, comprising:

specifying a configuration for integration test, the configuration including fewer servers than the plurality of servers in the distributed service under development, the configuration comprising one or more virtual servers in a single physical machine;

deploying, by a development tool, a first image of a first package and a second package of the plurality of packages to at least one virtual server of the one or more virtual servers;

modifying the second package of the plurality of packages;

replacing, in the at least one virtual server, the second package of the plurality of packages with the modified second package of plurality of packages;

testing at least a portion of the first image while the modified second package is integrated with the first package on the at least one virtual server; and when changes to the first image are not required, increasing the number of servers in the configuration and repeating the deploying, the modifying, the replacing and the testing.

7. A method as defined in claim 6, wherein deploying the first image comprises deploying the first package and the second package on first and second virtual servers, respectively.

8. A method as defined in claim 6, wherein the development tool includes information on a known good state for each of the plurality of packages.

9. A method as defined in claim 6, further comprising receiving through a user interface of the development tool a specification of a test configuration, and configuring the one or more virtual servers to execute the distributed service based on the specified test configuration.

10. A method as defined in claim 6, further comprising deploying, by the development tool, a second image of the first package and the second package of the plurality of packages to one or more additional virtual servers, and testing at least a portion of the second image in the one or more additional virtual servers.

* * * * *